Nov. 13, 1928.
E. VOSBURG
FASTENER
Filed March 26, 1927
1,691,833
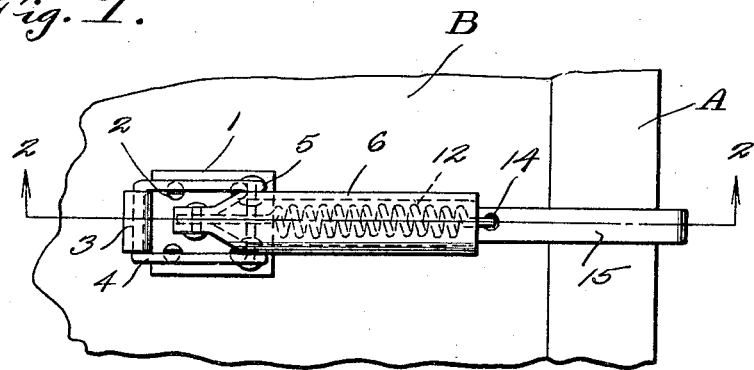
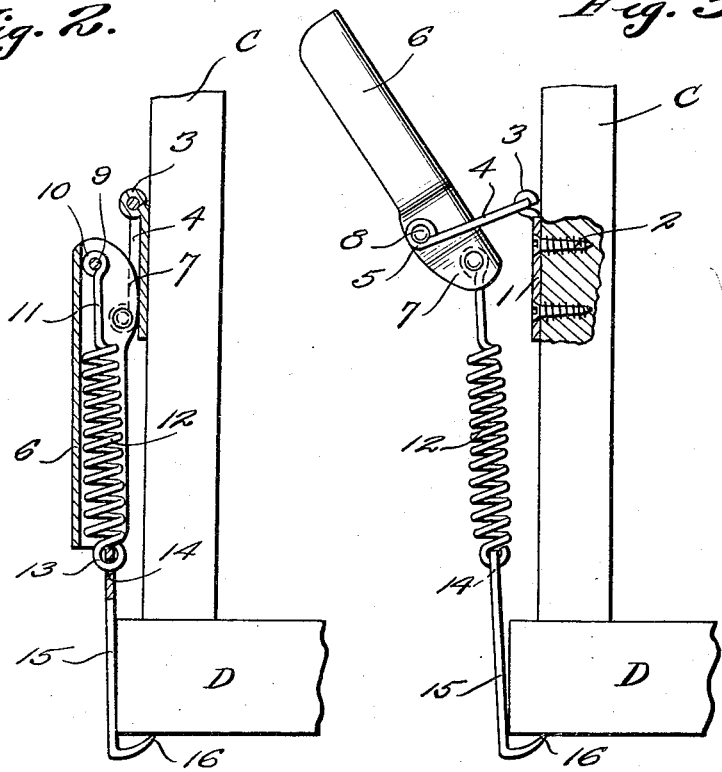

Patented Nov. 13, 1928.

1,691,833

UNITED STATES PATENT OFFICE.

EARL VOSBURG, OF ADA, MICHIGAN.

FASTENER.

Application filed March 26, 1927. Serial No. 178,741.

This invention relates to fasteners and its general object is to provide a fastener primarily designed for end gates and the like of vehicles, as well as for other uses, that can be easily and expeditiously operated with very little effort on the part of the operator and when used as a fastener for vertically movable vehicle gates, said fastener can be operated from the vehicle or otherwise and will retain the gate in closed position, as well as prevent the same from jumping or rattling.

A further object of the invention is to provide a fastener for gates and the like that is simple in construction, capable of enduring a long life and is inexpensive to manufacture.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a front view of the fastener as applied to a closure of the horizontal swinging type.

Figure 2 is a longitudinal sectional view of the fastener applied to a vertically movable end gate of a vehicle and showing the fastener in closed or operative position.

Figure 3 is a similar view but showing the parts of said fastener in partial open position.

Referring to the drawings in detail and particularly to Figure 1, the letter A indicates a portion of a closure frame and in the present instance may be one of the sides of a vehicle, while the letter B indicates an end gate or other closure of the horizontal swinging type. In the mentioned figure, the fastener is horizontally disposed adjacent the free end of the closure and is adapted to secure the same in closed position in a manner that will be presently described.

In Figures 2 and 3 of the drawings, I have shown the fastener vertically disposed for securing a vertically movable end gate or the like C in closed position and against the floor D of the vehicle.

While I have illustrated two uses of my fastener, it will be understood that it can be employed wherever a fastener of the type illustrated is needed, and the fastener includes a body plate 1 adapted to be secured to a closure and is provided with a plurality of apertures to receive screws 2. Formed with one edge of said body 1 is a barrel 3 which is adapted to pivotally receive the bight portion of a substantially U-shaped bail 4 having its arms terminating at their free ends into eyes 5.

The handle of the fastener is indicated by the reference numeral 6 and as shown is substantially U-shaped in cross section and enlarged adjacent one end as at 7. Extending outwardly from adjacent the juncture of the enlarged end with the body portion of the handle are headed studs 8 which pivotally receive the arms of the bail 4 through the medium of their eyes 5 as best shown in Figure 3 of the drawings. The enlarged portion 7 has its side walls bent inwardly to be arranged in close proximity as shown in Figure 1, and transversing the said walls is a headed pin 9 which pivotally receives the eyed end 10 of a shank 11 formed on one end of a coil spring 12. The opposite end of said spring is disposed at right angles to its convolutions and is also provided with an eye 13 which is received and secured in an opening 14 formed in one end of a latching plate 15 which is in the nature of a hook due to the fact that its opposite end is bent upon itself and terminates into a penetrating prong 16.

From the above description and disclosure of the drawings, it will be obvious that I have provided a fastener which can be easily and expeditiously applied to a closure member and is likewise easy to operate and such operation may be briefly described as follows. Assuming that the fastener is secured to a vertical movable end gate in the manner as illustrated in Figures 2 and 3 of the drawings, the latching plate 15 is positioned so that the penetrating prong 16 is disposed to grip the bottom D of the vehicle, thence the handle 6 is positioned about the spring 12 and acts substantially as a housing therefor as shown in Figure 2 with the result the fastener is disposed in operative position and will prevent the opening of the end gate C as well as the jumping or rattling thereof as will be apparent. The same is true with respect to a horizontal swinging closure as indicated by the letter B in Figure 1.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A fastener of the character described comprising a body plate, means for securing said body plate to a closure, a bail pivotally secured to said body plate and having the free ends of its arms formed with eyes, a substantially U-shaped in cross section handle pivotally secured to said arms through the medium of the eyes thereof, a pin transversing said handle, a coil spring pivotally secured to said pin and adapted to be received in the handle which acts as a housing therefor, and a penetrating means secured to said coil spring for gripping the frame of the closure.

2. A fastener of the character described comprising a body plate, means for securing said body plate to a closure, a hinge barrel formed with said body plate, a bail pivotally mounted in said barrel and including arms having their free ends terminating in eyes, a substantially U-shaped in cross section handle enlarged adjacent one end and having its side walls disposed in close proximity at said end, studs extending outwardly from said end and receiving the eyes of said bail, a coil spring, a shank formed on one end of said coil spring and terminating in an eye, a pin transversing said end of said handle and pivotally receiving the eye of said shank whereby the handle acts as a housing for said spring, a latching plate secured to the opposite end of said coiled spring and terminating in a penetrating prong to be received in the frame of the closure, when said spring is housed within said handle.

In testimony whereof I affix my signature.

EARL VOSBURG.